US012634310B2

(12) United States Patent
Luttwak et al.

(10) Patent No.: US 12,634,310 B2
(45) Date of Patent: May 19, 2026

(54) DETECTION OF ESCALATION PATHS IN CLOUD ENVIRONMENTS

(71) Applicant: Wiz, Inc., New York, NY (US)

(72) Inventors: Ami Luttwak, Binyamina (IL); Yinon Costica, Tel Aviv (IL); Assaf Rappaport, Tel Aviv (IL); Avi Tal Lichtenstein, Tel Aviv (IL); Roy Reznik, Tel Aviv (IL)

(73) Assignee: Wiz, Inc., New York, NY (US)

( * ) Notice: Subject to any disclaimer, the term of this patent is extended or adjusted under 35 U.S.C. 154(b) by 408 days.

(21) Appl. No.: 17/504,053

(22) Filed: Oct. 18, 2021

(65) Prior Publication Data

US 2023/0123477 A1     Apr. 20, 2023

(51) Int. Cl.
*H04L 9/40*          (2022.01)

(52) U.S. Cl.
CPC ................................ *H04L 63/1425* (2013.01)

(58) Field of Classification Search
CPC .. H04L 63/1425; H04L 63/1433; H04L 63/20
See application file for complete search history.

(56) References Cited

U.S. PATENT DOCUMENTS

| | | | |
|---|---|---|---|
| 9,462,010 | B1 | 10/2016 | Stevenson |
| 10,108,803 | B2 * | 10/2018 | Chari .................... G06F 21/577 |
| 10,681,074 | B2 | 6/2020 | Crabtree et al. |
| 10,963,583 | B1 | 3/2021 | Shimony |
| 11,606,378 | B1 * | 3/2023 | Delpont .................. H04L 43/16 |
| 11,777,948 | B2 * | 10/2023 | Agarwwal ........... H04L 63/102 726/1 |
| 11,785,051 | B1 | 10/2023 | Rossman et al. |
| 2008/0104665 | A1 | 5/2008 | Naldurg et al. |
| 2009/0271863 | A1 | 10/2009 | Govindavajhala et al. |
| 2009/0276853 | A1 | 11/2009 | Govindavajhala |
| 2009/0300532 | A1 | 12/2009 | Cowan |
| 2012/0151185 | A1 | 6/2012 | Bybell et al. |
| 2012/0198557 | A1 | 8/2012 | Pistoia et al. |
| 2012/0272322 | A1 | 10/2012 | Pistoia et al. |
| 2013/0067582 | A1 | 3/2013 | Donovan et al. |
| 2013/0067583 | A1 | 3/2013 | Naldurg et al. |
| 2013/0332726 | A1 | 12/2013 | Galehouse et al. |
| 2014/0089039 | A1 | 3/2014 | McClellan |

(Continued)

OTHER PUBLICATIONS

International Search Report for PCT Application No. PCT/IB2022/060012 dated Feb. 1, 2023. The International Bureau of WIPO.

(Continued)

*Primary Examiner* — Bassam A Noaman
(74) *Attorney, Agent, or Firm* — M&B IP Analysts, LLC

(57)          ABSTRACT

A method for detecting escalation paths in a cloud environment is provided. The method includes accessing a security graph representing cloud objects and their connections in the cloud environment; analyzing each cloud object to detect an escalation hop from a current cloud object to a next cloud object, wherein the analysis is based, in part, on a plurality of risk factors and reachability parameters determined for each cloud object; and marking the security graph with each identified escalation path in the security graph, wherein an escalation path is a collection of escalation hops from a source cloud object to a destination cloud object.

28 Claims, 6 Drawing Sheets

(56)  References Cited

U.S. PATENT DOCUMENTS

| | | | |
|---|---|---|---|
| 2014/0337618 A1 | 11/2014 | Galehouse et al. | |
| 2015/0143525 A1 | 5/2015 | Naldurg et al. | |
| 2016/0164904 A1 | 6/2016 | Alamuri | |
| 2016/0381026 A1 | 12/2016 | Pinto et al. | |
| 2017/0048266 A1 | 2/2017 | Hovor et al. | |
| 2017/0161495 A1 | 6/2017 | Viswanath et al. | |
| 2018/0234459 A1 | 8/2018 | Kung et al. | |
| 2018/0241768 A1 | 8/2018 | Seiver et al. | |
| 2018/0276383 A1 | 9/2018 | Venkataramani | |
| 2018/0367548 A1 | 12/2018 | Stokes, III et al. | |
| 2019/0260754 A1 | 8/2019 | Hecht | |
| 2019/0311115 A1 | 10/2019 | Lavi et al. | |
| 2019/0387009 A1 | 12/2019 | Kondaveeti | |
| 2020/0204465 A1 | 6/2020 | Baker et al. | |
| 2020/0213338 A1* | 7/2020 | Lotem | G06N 20/00 |
| 2020/0351298 A1 | 11/2020 | Paturi et al. | |
| 2020/0356663 A1 | 11/2020 | Paturi et al. | |
| 2020/0396244 A1 | 12/2020 | Paturi et al. | |
| 2021/0203684 A1 | 7/2021 | Maor et al. | |
| 2021/0218770 A1* | 7/2021 | Ben-Yosef | G06F 21/554 |
| 2021/0234889 A1* | 7/2021 | Burle | H04L 63/1433 |
| 2022/0060507 A1* | 2/2022 | Crabtree | H04L 63/1433 |

OTHER PUBLICATIONS

Written Opinion of the International Searching Authority for PCT Application No. PCT/IB2022/060012 dated Feb. 1, 2023. The International Bureau of WIPO.

Extended European search report for EP application 22883069.1, dated Feb. 24, 2025. European Patent Office, Munich, Germany.

\* cited by examiner

DETECTION OF ESCALATION PATHS IN CLOUD ENVIRONMENTS

TECHNICAL FIELD

The present disclosure relates generally to cybersecurity and, in particular, to detection of escalation paths in the cloud environment.

BACKGROUND

As businesses, governments, and organizations increasingly implement digital and connected technologies to efficiently manage operations, seamlessly connect with users, and otherwise improve offerings, the same technologies may create elevated security risks for the implementing party. Seemingly separate digital technologies may be interconnected within an organization's network, creating risks where vulnerability in one system could expose additional vulnerabilities in other, connected systems. As an example, a large retailer, operating many stores and processing large quantities of transactions, may rely on a payment processing system to collect and organize credit card payments for goods sold in brick-and-mortar stores. While the payment processing system used may be well-supported and resistant to cyberattacks, the system may be interconnected with other, less-secure systems, such as a store's network. Where, in the same example, a store includes only a single digital entrance and exit point, such as an internet connection provided by a single internet service provider (ISP), payment systems, heating, ventilation, and air-conditioning (HVAC) systems, in-store music systems, and the like, which may be interconnected by the systems' connections with the single internet access connection. Where, in the same example, an attacker is able to gain malicious access to an in-store HVAC system, the attacker may use this access to move from system to system within the store's network, eventually gaining access to the retailer's global payment system, which includes the customers' credit card information. Further, in a similar example, an attacker may be able to gain access to protected cloud accounts, such as an administrator-role account for an online shopping platform, by gaining similar access to an unprotected, external system and, using access keys made accessible by vulnerabilities included in the external system, maneuver through one or more systems of the network environment to ultimately gain administrator access.

The technique described with respect to the above example is commonly referred to as "lateral movement" or "attack escalation". Attackers employing lateral movement techniques may seek to compromise an auxiliary system, which does not include sensitive data and, from the compromised system, move laterally within a network to collect sensitive data and compromise more-secure systems. During the execution of such attacks, attackers may survey network systems, collecting information regarding connections within the network, security measures, and the like, and, using this information, search less-secure systems and devices for credentials and other data, which may grant access to more-secure systems and devices. As the risk posed to a business or other organization by such attacks may be great, network administrators, and the like, may employ various systems and techniques to identify attackers, block access, and otherwise mitigate potential damage. However, due to the shortcomings of such solutions, many attacks may be detected only after the attacker has secured access or compromised valuable data.

Various solutions may be employed to identify potential attack vectors, by which attackers may execute such movements, and restrict the access of such attackers, such as by remedying vulnerabilities leading to potential escalation paths, and otherwise mitigate potential damage. Solutions may include device-level, system-level, and network-level systems and methods, where such solutions may be directed to various aspects of detection and prevention. However, such solutions may be limited by various functional restrictions, including operations restricting detection and prevention to single network objects, single network sub-systems, or single layers of a network environment.

Organizations have transitioned to the cloud environments which provide flexibility in execution of applications or services, but at the same time, increases the vulnerability due to the complexly of the cloud infrastructure. That is, a typical cloud environment may include many cloud objects that participate in the execution of a single process or service of an application. A cloud object is a physical or virtual entity that may include any compute being executed or capable of executing code in the cloud, store data in a cloud, provide network connection, and the like. Every cloud object has a set of configurations and can communicate or share information with other nodes. Thus, there are a number of vulnerable points which can be exploited by an attacker. For example, a misconfiguration of a device may allow access to that which a second object holding sensitive information cannot grant.

As such, solutions which offer detection and prevention for single (isolate) devices, objects, and the like may not be suitable to protect an organization's cloud environment as a whole. Further, existing solutions cannot detect escalation paths from one cloud object to another; such solutions may fail to provide for management of attack vectors resulting from access to various cloud objects. Further, existing solutions may alert on potential lateral movement by relying on detecting a single vulnerability issue with each cloud object. However, such an issue, even if detected, cannot lead to attack escalation (of lateral movement). For example, the object can be scanned to identify vulnerable operation system processes, and from that, derive privilege escalation. However, the privilege escalation may be caused by misconfiguration of network parameters, and thus cannot be detected. Therefore, existing security solutions fail to consider and analyze all security aspects related to a cloud object, thus may fail to provide for complete protection of an organization's network infrastructure against such attacks.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for detecting escalation paths in a cloud environment. The method comprises accessing a security graph representing cloud objects and their connections in the cloud environment; analyzing each cloud object to detect an escalation hop from a current cloud object to a next cloud object, wherein the analysis is based, in part, on a plurality of risk factors and reachability parameters determined for each cloud object; and marking the security graph with each identified escalation path in the security graph, wherein an escalation path is a collection of escalation hops from a source cloud object to a destination cloud object.

Certain embodiments disclosed herein also include a non-transitory computer readable medium having stored thereon instructions for causing a processing circuitry to execute a process for detecting escalation paths in a cloud environment, the process comprising accessing a security graph representing cloud objects and their connections in the cloud environment; analyzing each cloud object to detect an escalation hop from a current cloud object to a next cloud object, wherein the analysis is based, in part, on a plurality of risk factors and reachability parameters determined for each cloud object; and marking the security graph with each identified escalation path in the security graph, wherein an escalation path is a collection of escalation hops from a source cloud object to a destination cloud object.

In addition, certain embodiments disclosed herein include a system detecting escalation paths in a cloud environment. The system comprises: a processing circuitry; and a memory, the memory containing instructions that, when executed by the processing circuitry, configure the system to: access a security graph representing cloud objects and their connections in the cloud environment; analyze each cloud object to detect an escalation hop from a current cloud object to a next cloud object, wherein the analysis is based, in part, on a plurality of risk factors and reachability parameters determined for each cloud object; and mark the security graph with each identified escalation path in the security graph, wherein an escalation path is a collection of escalation hops from a source cloud object to a destination cloud object.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
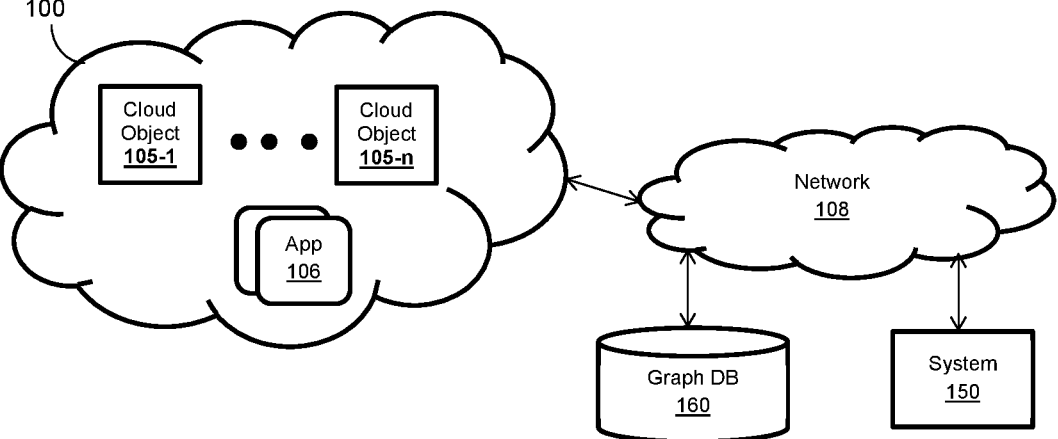
FIG. 1 is a diagram of a cloud analysis architecture, utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Privilege escalation is the act of exploiting a bug, design flaw, or configuration oversight in an operating system or software application in order to gain elevated access to resources that are normally protected from an application or user. According to the disclosed embodiments, a method and system for detecting privilege escalation paths in a cloud environment is disclosed. An escalation path is when one cloud object (resource) is exploited to access at least another resource connected thereto with privilege access. The disclosed embodiments provide a compressive risk analysis of cloud objects in a cloud environment to detect any risks that may lead to unauthorized privilege escalations. The analysis may include, but is not limited to, vulnerability, identity, network exposed secrets, and technologies.

In an embodiment, the analysis is performed on a security graph showing all cloud objects and their connections in the cloud environment. Thus, by performing risk analysis on cloud objects, escalation path origins from each risky object can be determined.

It should be noted that in the disclosed embodiments, escalation paths cannot be determined through a manual process due to the number of objects (thousands) in a typical cloud environment, the frequent changes in objects, frequent code changes, and so on. The detection of possible escalation paths is a dynamic process.

FIG. 1 is an example diagram of a cloud environment 100 utilized to describe the various embodiments. A cloud environment 100 represents an organization's cloud-based resources, and the various connections between such resources. The cloud environment 100 may include multiple cloud objects 105-1 through 105-$n$ (hereinafter, "objects" 105 or "object" 105), one or more applications 106 (collectively referred to as applications or apps 106). Further, the cloud environment 100 may be configured to connect, via a network 108, with a cybersecurity system 150 for one or more purposes including, and without limitation, those described hereinbelow.

A cloud environment 100 may be a commercially-available cloud system, provided on a service basis, such as, as examples and without limitation, Amazon AWS®, Microsoft Azure®, and the like. A cloud environment 100 may be a private cloud, a public cloud, a hybrid cloud, and the like. In addition, a cloud environment 100 may include, without limitation, container orchestration or management systems or platforms such as, as an example, a Kubernetes® deployment, and the like, as well as any combination thereof.

Cloud objects 105 may include objects, systems, devices, components, applications, entities, and the like, configured to operate within the cloud environment 100, and provide various functionalities therein. Cloud objects 105 may include one or more types of objects, including, without limitation, network objects, compute objects, and the like. A cloud object 105 may be a physical entity, a virtual entity, or a combination thereof.

Network objects are objects 105 configured to provide one or more traffic-management functionalities within a network. Examples of network objects include, without limitation, proxies, load balancers, firewalls, and the like. Further, compute objects are objects 105 configured to provide one or more data processing or management functionalities. Examples of compute objects 105 include, without limitation, databases, fileservers, dedicated processing hardware, and the like. Examples for virtual compute objects 105 include virtual machines, software containers, serverless functions, microservices, and the like.

Cloud objects 105 may be configured to include one or more communication ports, where the included communication ports provide for the connection of various objects 105 according to one or more protocols, and at different communication layers of the OSI model. In an example configuration, the objects 105 are virtual entities or instances of subnets, hubs, virtual private networks (VPNs), and the like, as well as any combination thereof.

The applications 106, as may be hosted, executed, and the like, as well as any combination thereof, the cloud environment 100 include services, processes, and the like, configured to provide one or more functionalities by execution of various commands and instructions. The applications 106 may interact or communicate with other objects, applications, and other, like features, including those objects, applications, and the like, deployed in separate networks, cloud environments, and the like, as well as any combination thereof.

To the network 108 a cybersecurity system 150 and a graph database (DB) 160 are connected. The system 150 and DB 160 may be physically separated from the cloud environment 100 or may be co-located with the cloud environment 100. The cybersecurity system 150, is configured to identify escalation paths in a security graph stored in the graph database 160. The security graph includes a collection of network and computing graphs.

The network 108 may connect the cloud environment 100 with the graph database DB and the system 150. The network 108 may be implemented as a physical network of discrete systems, devices, components, objects, and the like, as a virtual network, providing for the interconnection of various virtual systems and devices, as well as a hybrid physical-virtual network, including both physical and virtualized components. The network may be, for example and without limitation, a local area network, a wide area network, the Internet, the World-Wide Web (WWW), and the like, as well as any combination thereof.

The cybersecurity system 150 is configured to provide one or more cybersecurity functionalities including, without limitation, identification of escalation paths, as will be discussed below. The cybersecurity system 150 may be configured as a physical system, device, or component, as a virtual system, device, or component, or as a hybrid physical-virtual configuration. A detailed description of a cybersecurity system, 150, according to an embodiment, is provided with respect to FIG. 5, below. The cybersecurity system 150 can determine escalation paths in the cloud environment 100 without having any device, agent, service, and the like installed in the environment 100 or the cloud objects 105.

It may be understood that, while the cybersecurity system 150 is depicted in FIG. 1 as an element of a remote cloud environment (i.e., not the cloud environment 100 being processed), the cybersecurity system 150 may be included within any of the various elements of the network architecture, including the cloud environment 100.

The graph database (graph DB) 160 is a storage or memory component, device, system, or the like, configured to provide one or more functionalities relevant to storage of graph-related data. The graph DB 160 may be configured to store graph-related data features of one or more types or formats, including, without limitation, raw data, graphs, graph edges, graph vertices, graph schemas, and the like, as well as any combination thereof, including those types or formats described hereinbelow.

The graph DB 160 may be configured as a physical entity, a virtual entity, and the like. It may be understood that, while the graph DB 160 is depicted in FIG. 1 as an element of the remote environment, the graph DB 160 may be included within any of the various elements of the network architecture, including the cloud environment 100, and subparts thereof, and the network 108, and the like, without loss of generality or departure from the scope of the disclosure. Further, it may be understood that the graph DB 160 may be directly connected to, or realized as a component of, the graph analysis system 150, without loss of generality or departure from the scope of the disclosure.

Graphs, as may be included in the graph DB 160, are data features including one or more graph vertices, where such graph vertices may be variously interconnected by one or more graph edges. Graphs may be configured to provide for one or more representations of various data sets, including, without limitation, presentation of network data according to one or more graph schemas, as described hereinbelow. As an example, a graph relevant to the description of a collection of interconnected objects may include one or more graph vertices, where each graph vertex corresponds to an object and graph edges between such vertices, where the edges correspond with the connections between the various objects.

In an embodiment, the graph DB 160 may be configured to store at least one security graph generated to include cloud objects 105 included in the cloud environment 100. The security graph configured to include labeling functionality may be configured to provide for the labeling of graph vertices, graph edges, or both, with one or more labels describing the various properties of a cloud object 105. In an embodiment, one of the properties may include a risk factor, determined by risk analysis of the cloud object 105. A risk factor may be determined based, in part, on vulnerability analysis, identity analysis, network exposed secrets analysis, technologies analysis, and the like, or any combination thereof.

Figure 2:
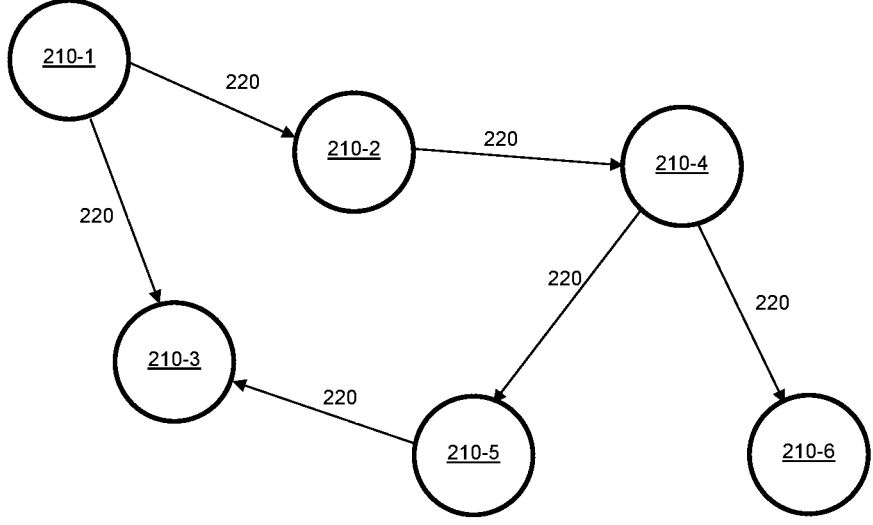
FIG. 2 is a diagram of a security graph utilized to describe the various embodiments.

FIG. 2 is an example security graph 200 describing the disclosed embodiments for identifying privilege escalation paths in a cloud environment according to an embodiment. The example security graph 200 may include a plurality of cloud objects, here 6 cloud objects 210-1 through 210-6. Examples of types of cloud objects are discussed above.

Cloud objects 210 may be connected to each other, for example, an object 210-1 is connected to objects 210-2 and 210-3. A connection (represented by vertex 220) may be a network connection, an access role, an API, and so on. For example, the object 210-1 is a virtual VM and the objects 210-2 and 210-3 are access roles.

Cloud objects are connected in the graphs via vertices (collectively labeled as '220') that may represent connections between the various objects. Such connections may represent data, control, network connections, and/or other types of relationships.

Each cloud object 210 is represented with an enriched data set (EDS) that is saved as part of the graph. An EDS may include an object name, an object type, an object connection latency, risk factors, reachability parameters, technology type, and object properties.

Object properties may include secrets, identities, and other provisions, information, and the like. Identities define object access roles or profiles. Examples of object access roles or profiles may include "user access", "guest access", "power user access" roles, "administrator access", and the like. The roles may be defined with access permission, such as, but not limited to, limited access, read only, full access, and the like. Secrets are related to access credentials and may include, as examples and without limitation, usernames, passwords, access to personal identification numbers (PINs), timed access tokens, and the like, and so on.

The reachability parameters may include a source IP address, a destination IP address, a port number, a security group, and so on. The reachability parameters allow to determine how one object can be reached or can access another object through one or more hops. For example, an object 210-4 (gateway) is currently active, and is connected to an object 210-5 (VM) via the port 8080, using the HTTP protocol. Example techniques for detecting reachability parameters and reachability of cloud objects are further discussed in U.S. patent application Ser. No. 17/179,135, assigned to the common assignee and it is hereby incorporated by reference for all that it contains.

The risk factors are generated by performing risk analysis on each cloud object 220. A risk factor can be represented using a score, description, or combination thereof. According to the disclosed embodiments, the risk analysis may include vulnerability analysis to detect any known or unknown vulnerabilities identified in the object.

The risk analysis may further include identity analysis to detect any misconfiguration or other issues of an identity in an object. An identity is an example of a principal, which acts on a cloud object (resource) 210. An identity may be, for example, a username, of a person, an organization, and so on. An identity vulnerability may occur when the identity is used to access another similar object (e.g., user A is able to access emails of user B). Another example of identity vulnerability may include using the identity of an object to access permission of another object. Another example of identity vulnerability is when an identity of a first object is associated with a permission to act on a second object. The various techniques for detecting identity vulnerabilities are discussed, for example, in U.S. Patent Provisional Application Nos. 63/222,709, 63/222,714, and 63/222,719, assigned to the common assignee and they are hereby incorporated by reference.

According to the disclosed embodiments, the risk analysis may include exposed secrets analysis to detect exposed or weak secrets. Secrets may include login credentials (e.g., passwords) that were either guessed, stored locally in the object, or were previously compromised. An example technique for secret analysis can be found in U.S. Provisional Application No. 63/212,975, assigned to the common assignee and it is hereby incorporated by reference.

According to the disclosed embodiments, the risk analysis may include vulnerability analysis related to a technology product implemented by a cloud object. A technology product may include a software product, a software service, a hardware product, an infrastructure service, an infrastructure product, and the like. For example, MongoDB® is a type of technology for implementing a database object. As another example, a virtual machine can be realized as an Apache® web server (technology product). The risk analysis of technology products may include vulnerabilities known to be relevant to the specified technology, any version of the technology, and so on. For example, Apache® web server version 'v02' has a known vulnerability that should be addressed. Techniques for detecting vulnerabilities of technologies are further discussed in U.S. patent application Ser. No. 17/190,148, assigned to the common assignee and it is hereby incorporated by reference for all that it contains.

In an embodiment, the risk analysis may relate to network objects, i.e., cloud objects classified as a network device (virtual or physical). The network analysis may include determining if a cloud (network) object is accessible from an external network (e.g., the Internet) and/or if access to such an object is secured. The network analysis may be based on the reachability parameters as discussed in the above-referenced Ser. No. 17/179,135 application.

According to the disclosed embodiments, potential escalation paths of privilege escalations are detected by traversing the security graph 200. An escalation path is when privilege escalation in one object allows to access another object connected thereto. That is, an escalation path is a combination of privilege escalations from a source object to a destination object in the security graph 200. The destination may also be a combination of a cloud object and role (e.g., VM with IAM:attachRolePolicy can escalate to any role). An escalation path is determined when there is access to an object hosting sensitive data or resources.

As will be discussed below, a potential privilege escalation is determined by analyzing the EDSs associated with each cloud object in the graph to determine if privilege escalations can be achieved to access another node, connected thereto. The detection of a potential path is further performed by analyzing reachability parameters, identity, secrets, and risk factors (vulnerabilities) of each encountered object. The analysis can start at a source object and end at a destination object, by traversing the graph, searching the graph, and so.

It should be emphasized that escalation paths may include a sequence of cloud objects 210 (two or more) of different types. That is, escalation paths detected according to the same embodiments may include a collection of compute objects (e.g., VMs), network objects (e.g., NICs), cloud platforms (different IaaSs), and applications. A path may include objects of the same type.

The detected escalation paths can be marked on the security graph 200 or saved in a separate database (not shown). The security graph 200 can be queried on any detected escalation paths. In an embodiment, any security graph 200 can be reported to a user.

Figure 3A:
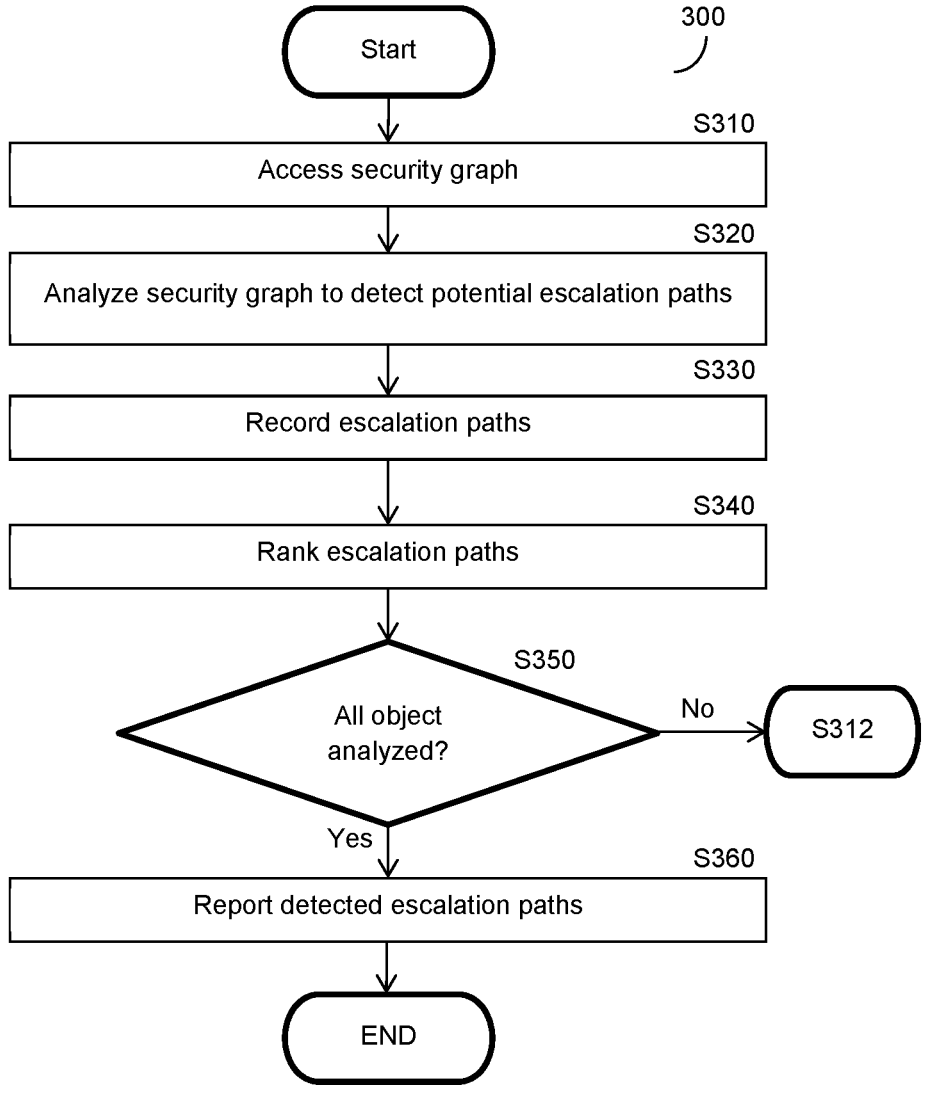
FIGS. 3A and 3B are flowcharts depicting a method for detecting escalation paths in a graph, according to an embodiment.

FIG. 3A is an example flowchart 300 depicting a method for identifying escalation paths in a cloud environment according to an embodiment.

At S310, a security graph stored in a graph database is accessed. As described hereinabove, a security graph lists all cloud objects and their connections in the cloud environment. Further, each node (representing an object) in the security graph lists the EDSs for the object. An EDS may include object properties, reachability parameters, risk factors, and so on. A detailed description of the EDSs is discussed in greater detail above. In an embodiment, the graph may designate a seed (or source) node.

At S320, the accessed security graph is analyzed to identify potential escalation paths. An escalation path is when privilege escalation in one object allows to access another object connected thereto, where a connection may be data, network, or control connection. That is, an escalation path is a combination of privilege escalations from a source object to a destination object in the security graph. In an embodiment, an escalation path is determined when there is access to an object hosting sensitive data or resources.

In an embodiment, S320 includes traversing the security graph and analyzing each encounter node (object) in the graph to determine if any risk factors can be exploited to reach another cloud object. It is further determined if a reached object in the path holds, contains, or provides access to sensitive information that can harm the organization. This would allow to rank detected escalation paths according to the severity of the exposed data. The analysis of cloud objects may include analyzing EDS associated with each object in the security graph. In an example embodiment, the analysis can start at a designated source security object, and end at a destination object.

Figure 3B:
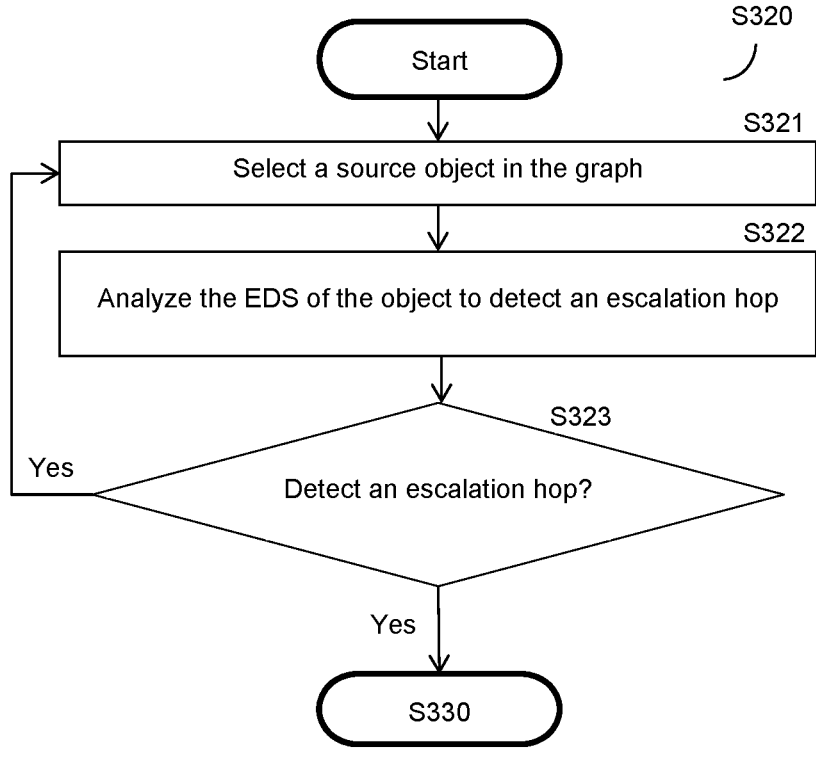

The operation of S320 is illustrated in FIG. 3B. At S321, a source object or node in the security graph are selected. The source node is the first cloud object to start the graph traversal. The source node may be designated in the graph, preselected by a user, or randomly selected. The source node may also include the next hop in a detected escalation hop. It should be noted that in certain embodiments, the first cloud object (node) is a destination object to determine if there are any escalation paths that can reach to reach such a cloud object.

At S322, an EDS of the cloud object is accessed and analyzed to determine if there is an escalation hop from the current object to an object connected thereto, for example, an escalation hop from an object 220-1 to an object 220-2. In an embodiment, the analysis is performed by processing all risk factors in the EDS, reachability parameters, secrets, and identities, thus providing multi-layer analysis of potential privilege escalation. The analysis is static analysis, i.e., static simulation of the potential escalation hop from one object to another. The static analysis may include analysis of information of in the EDS, based on simulated reachability, as defined in the respective EDS. It should be noted that simulated analysis does not include sending any traffic, control, or actually attempting to exploit the detected vulnerability. As an example, if a first object is a proxy device that saves (e.g., in a log file) a secret (password) to access a repository and the reliability parameter indicates that the proxy device is connected to the repository through an open port, that would indicate a potential escalation hop.

Generally, the static simulation attempts to determine if a combination of a risk factor and at least one reachability parameter leads to escalation to a different cloud object, including different roles.

The simulation can attempt specific escalation for roles, secrets, and vulnerability. For a role escalation it is checked if a combination of permission conditions and resource conditions lead to escalation to specific role(s). For example, lambda:updateFunctionCode and lambda functions in the account allow escalation to all roles currently assigned to lambda functions.

For secrets escalation, it is checked if there is a secret noted in the risk factor (stored in the object's EDS) providing access to a different object (e.g., disk, cloud key, VM, and the like). A chain of secrets can be simulated. For example, [access to disk/storage]→[cloud key]→[role] or [storage]→[ssh key]→[VM]

For vulnerability check, it is determined a cloud object is found to have a validated (known) vulnerability and a reachability parameter to a different cloud object. For example, a compute object with a configured network access validated vulnerability provides access to a VM.

Following are additional examples for potential escalation paths that can detected by the static analysis: cloud object configured with "iam:*" permission; a cloud object configured with a cluster admin role; a cloud object configured with a cloud access key on its disk; and a cloud machine configured with modification permissions "ec2.*". In an embodiment, the analysis performed at S310 can detect escalation paths that can leverage multiple hops across identity and network access. As an example, the attacker can leverage a serverless function in production network (e.g., access a DB in production using a lambda function) permissions. The serverless function is exploited within the production network to launch and exploit against a critical service.

In an embodiment, the analysis can further detect escalation paths across different cloud platforms. For example, detection of exposed critical cloud key (secret) in a VM in one cloud platform (e.g., AWS®), the key provides a login to a different cloud platform (e.g., Azure®). The exposed key can further provide access to an account in the "target" cloud platform, thus leveraging the secret to continue the attack cross-cloud.

At S323, it is checked if there is an escalation hop, and if so, execution returns to S321 where a cloud object representing the next hop is selected and then analyzed. Otherwise, execution continues with S330.

It should therefore be appreciated that the analysis performed at S320 can be utilized to detect potential escalation paths across multiple hops, domains, and cloud platforms.

At S330, any escalation path detected or identified at S320 is recorded. Escalation paths may be recorded by creating or updating one or more data features to include descriptions of the escalation paths identified at S310. This may include marking nodes (cloud objects) that are part escalation paths, listing all paths and their objects, updating an object's EDS to note that such object is part of an escalation path.

At S340, optionally, each recorded escalation path is ranked based on severity. The ranking may be based on the type of objects in the path being exposited, the type of data that can be accessed, how objects in a detected path can be reached (e.g., for external network or internal network), who can access objects in a detected path (e.g., any public access on organization access), the type of destination object of a path (i.e., if it is a designated object or a "sensitive" object), and so on. Such parameters can be weighted to compute a severity score for each detected escalation path. In an embodiment, the rank is determined based on a probability that a detected escalation path indeed causes privilege escalation. To this end, the escalation paths detection may be operated in two different modes: deterministic (where the probability of detection is high) and undeterministic (where the probability of detection is low).

At S350, it is checked if the entire security graph was traversed or analyzed. If so, execution continues with S360; otherwise, execution returns to S312 where a new source node is selected.

At S360, detected escalation paths are reported. S360 may include the generation of one or more reports, presentations, displays, and the like, such as may be relevant to report the described information. It should be noted that escalation paths can be obtained by querying the security graphs, once the detected paths are marked thereto.

The method described herein may be performed by the system 150 (FIG. 1) by accessing cloud objects and infrastructure. The analysis of such objects and infrastructures does not require installation of any dedicated software agent or code in the cloud environment.

It should be noted that detection escalation paths through traversing the security graph is one example of implementation. Other implementations may include searching the graph, analyzing different sections of the graph in parallel, and so on.

It should be further noted that nodes and cloud objects may interchangeably be discussed herein but refer to the same instance. A node is a representation of a cloud object in the security graph.

Figure 4:
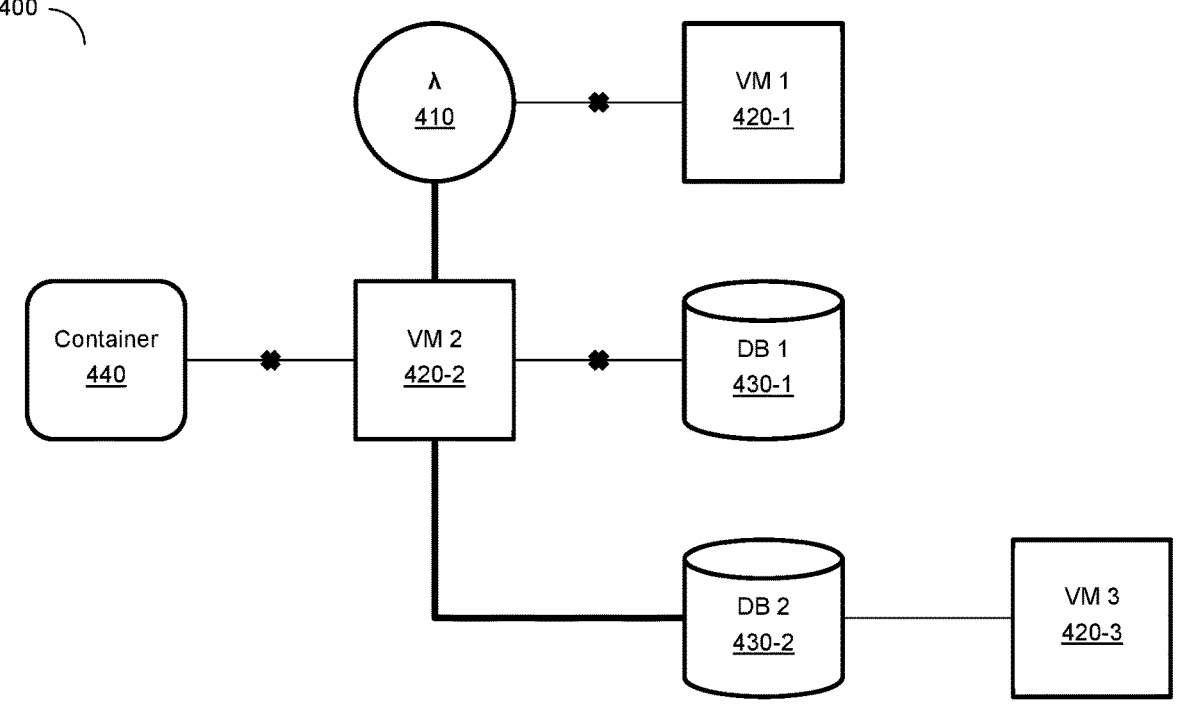
FIG. 4 is a diagram showing an example escalation path detected on a security graph.

FIG. 4 is an example diagram of a security graph 400 including escalation paths, utilized to describe the various embodiments. The depicted example security graph 400 includes the following cloud objects: a serverless function 410, VMs 420-1 through 420-3, DBs 430-1 and 430-2, and a software container 440, which are variously interconnected as depicted in the example diagram 400. It should be noted that the connections are not necessary physical connections but may represent a flow of data and/or control.

The security graph 400 provides an illustration of an escalation path determination, as is discussed hereinbelow, for a path originating at the serverless function 410 and directed to a DB 430-2. According to the example, the serverless function 410 includes secrets relevant to gain access to VM 420-2, but not to gain full privileges to VM 420-2, and does not include secrets relevant to gain access to VM 420-1, and VM 420-2 includes secrets relevant to gain full privileges to DB 430-2, but not to the connected container 440 or DB 1 430-1.

During escalation path analysis, exposed secrets designed in EDS from the serverless function 420-1 are analyzed. In the example, an exposed secret is a private encryption key that provides access from the serverless function 420-1 to VM 420-2. There is no exposed secret to access VM 420-1. In addition, path analysis, from the serverless function 410, may include comparing the secrets collected from the serverless function 410 with the identities of each connected object. Thus, there is an escalation hop from a function 420-1 to a VM 420-2, and no escalation hop from function 420-1 to a VM 420-1.

Following the escalation hop from the function 410 to the VM 420-1, in a regular user role, the described escalation path analysis may continue, executed with respect to VM 420-2. As described, the VM 420-2 may include a secret, private key, relevant to access DB 430-2 with full privileges, and no secrets relevant to DB 430-1 or the container 440. Thus, there is an escalation hop from VM 420-2 to DB 430-2. As full privileges are available for DB 430-2, based on the secrets collected from the VM 420-2, execution may, according to the methods described herein, terminate following identification of the last escalation hop. In this example, the escalation path would be the serverless function 410 to the DB 430-2, via the VM 420-2.

In some embodiments, it is checked if information learned through exploitation of one object would allow for a privilege escalation in a cloud object not directly connected to the exploited cloud object. For example, it may be determined in a weak secret saved in VM 420-1 can be used to access the DB 420-3.

The disclosed embodiments have been discussed herein with a reference to a specific embodiment where a cloud environment is analyzed. The teachings discussed herein can be utilized to analyze escalation paths in infrastructure as a code (IaC) environment. Such environments provide the blueprints for deployment and execution of cloud object in a cloud embodiment.

Figure 5:
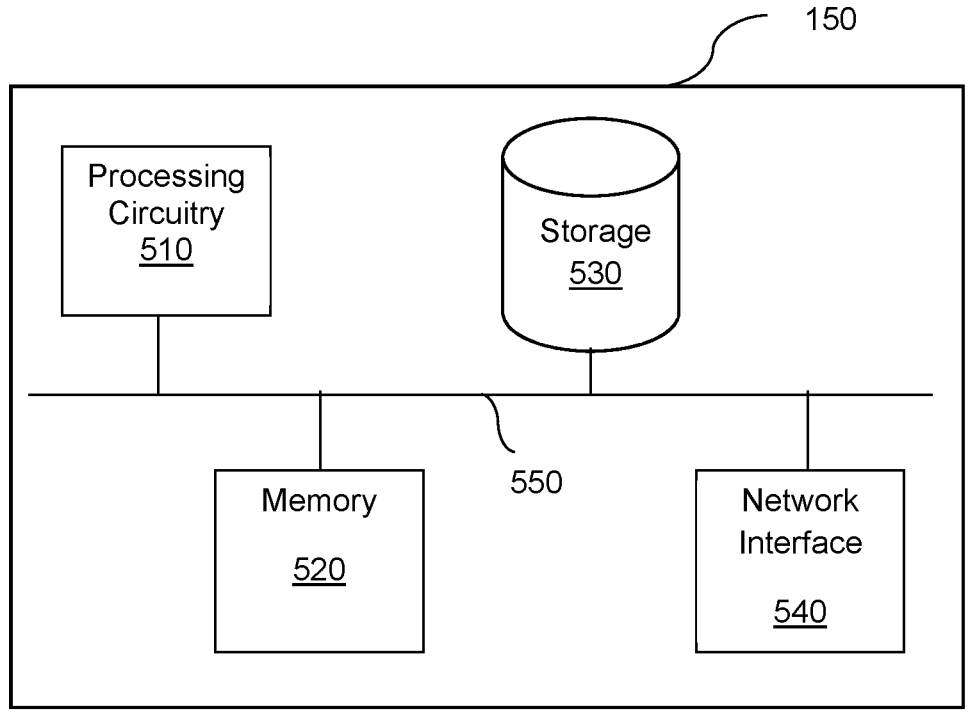
FIG. 5 is a hardware block diagram depicting a cybersecurity system, according to an embodiment.

FIG. 5 is an example hardware block diagram 500 depicting a cybersecurity system 150, according to an embodiment. The cybersecurity system 150 includes a processing circuitry 510 coupled to a memory 520, a storage 530, and a network interface 540. In an embodiment, the components of the cybersecurity system 150 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, the software for implementing one or more embodiments disclosed herein may be stored in the storage 530. In another configuration, the memory 520 is configured to store such a software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 540 allows the cybersecurity system 150 to communicate with the various components, devices, and systems described herein for escalation path detection, as well as other, like, purposes.

It should be understood that the embodiments described herein are not limited to the specific architecture illustrated in FIG. 5, and other architectures may be equally used without departing from the scope of the disclosed embodiments.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and a microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting escalation paths in a cloud environment, comprising:
    accessing a security graph representing all cloud objects and their connections in the cloud environment, each cloud object being represented with an enriched data set (EDS) stored in the security graph;
    determining for each cloud object a plurality of reachability parameters;
    storing the plurality of reachability parameters that are determined for each cloud object in the EDS of the respective cloud object for which the plurality of reachability parameters were determined;
    analyzing each cloud object of the security graph utilizing static analysis based on (i) a plurality of risk factors that are generated by performing a risk analysis for each individual one of the cloud objects and (ii) the reachability parameters of the each individual one of the cloud objects;
    detecting, based on the analysis, an escalation hop from a current cloud object to a next cloud object; and
    recording for each cloud object of an escalation path a data feature in the security graph indicating the escalation path, wherein an escalation path is a collection of escalation hops from a source cloud object to a destination cloud object having a higher privilege than the source cloud object.

2. The method of claim 1, further comprising:
    traversing the security graph from the source cloud object to analyze all available paths from the source cloud object.

3. The method of claim 1, wherein a detected escalation hop is an exploitation of a current analyzed cloud object to a cloud object connected thereto.

4. The method of claim 3, wherein a connection between two cloud objects includes any one of: a role connection, a network connection, a control connection, and a data connection.

5. The method of claim 1, wherein each of the plurality of risk factors is an available privilege escalation realizable due to by a vulnerability detected within a cloud object, wherein the plurality of risk factors are maintained in an enriched data set (EDS) associated with each cloud object.

6. The method of claim 5, wherein the vulnerability includes any one of: an exposed secret vulnerability, a network vulnerability, a known vulnerability, an unknown vulnerability, an identity vulnerability, and a technology product vulnerability.

7. The method of claim 1, wherein analyzing each cloud object to detect an escalation hop further comprises:
    determining, for a current cloud object, if a combination of each of the plurality of risk factors and at least one of the reachability parameters leads to a privilege escalation to a cloud object having a different role than the current cloud object.

8. The method of claim 1, wherein the escalation is a secret escalation, and wherein analyzing each cloud object to detect an escalation hop further comprises:
    determining if a secret noted in a risk factor of the plurality of risk factors provides access to the next cloud object, wherein the secret is included in an EDS of the current cloud object.

9. The method of claim 1, wherein analyzing each cloud object to detect an escalation hop further comprises:
    detecting an escalation path leveraging multiple hops across identity and network access.

10. The method of claim 1, wherein analyzing each cloud object to detect an escalation hop further comprises:
    detecting an escalation path leveraging multiple hops across different cloud computing platforms in the cloud environment.

11. The method of claim 1, wherein analyzing each cloud object includes performing static analysis of each cloud object.

12. The method of claim 1, wherein each cloud object is a node in the security graph.

13. The method of claim 1, wherein detecting the escalation paths includes any one of: deterministic detection and un-deterministic detection.

14. The method of claim 1, further comprising:
    generating a severity ranking for each detected escalation path, based on any one of: a type of object, a type of accessible data, an internal network access, an external network access, and a combination thereof.

15. A non-transitory computer readable medium having stored thereon instructions for causing a processing circuitry to execute a process for detecting escalation paths in a cloud environment, the process comprising:
    accessing a security graph representing all cloud objects and their connections in the cloud environment, each cloud object being represented with an enriched data set (EDS) stored in the security graph;
    determining for each cloud object a plurality of reachability parameters;
    storing the plurality of reachability parameters that are determined for each cloud object in the EDS of the respective cloud object for which the plurality of reachability parameters were determined;
    analyzing each cloud object of the security graph utilizing static analysis based on (i) a plurality of risk factors that are generated by performing a risk analysis for each individual one of the cloud objects and (ii) the reachability parameters of the each individual one of the cloud objects;
    detecting, based on the analysis, an escalation hop from a current cloud object to a next cloud object; and
    recording for each cloud object of an escalation path a data feature in the security graph indicating the escalation path, wherein an escalation path is a collection of escalation hops from a source cloud object to a destination cloud object having a higher privilege than the source cloud object.

16. A system for detecting escalation paths in a cloud environment, comprising:

a processing circuitry; and a memory, the memory containing instructions that, when executed by the processing circuitry, configure the system to:

access a security graph representing all cloud objects and their connections in the cloud environment, each cloud object being represented with an enriched data set (EDS) stored in the security graph;

determine for each cloud object a plurality of reachability parameters;

store the plurality of reachability parameters that are determined for each cloud object in the EDS of the respective cloud object for which the plurality of reachability parameters were determined;

analyze each cloud object of the security graph utilizing static analysis based on (i) a plurality of risk factors that are generated by performing a risk analysis for each individual one of the cloud objects and (ii) the reachability parameters of the each individual one of the cloud objects;

detect an escalation hop from a current cloud object to a next cloud object; and recording for each cloud object of an escalation path a data feature in the security graph indicating the escalation path, wherein an escalation path is a collection of escalation hops from a source cloud object to a destination cloud object having a higher privilege than the source cloud object.

17. The system of claim 16, wherein the system is further configured to:

traverse the security graph from the source cloud object to analyze all available paths from the source cloud object.

18. The system of claim 16, wherein a detected escalation hop is an exploitation of a current analyzed cloud object to a cloud object connected thereto.

19. The system of claim 18, wherein a connection between two cloud objects includes any one of: a role connection, a network connection, a control connection, and a data connection.

20. The system of claim 16, wherein each of the plurality of risk factors is an available privilege escalation realizable due to by a vulnerability detected with a cloud object, wherein the risk factors are maintained in an enriched data set (EDS) associated with each cloud object.

21. The system of claim 20, wherein the vulnerability includes any one of: an exposed secret vulnerability, a network vulnerability, a known vulnerability, an unknown vulnerability, an identity vulnerability, and a technology product vulnerability.

22. The system of claim 16, wherein the system is further configured to:

determine, for a current cloud object, if a combination of each of the plurality of risk factors and at least one of the reachability parameters leads to a privilege escalation to a cloud object having a different role than the current cloud object.

23. The system of claim 22, wherein the privileged escalation is secrets escalation, and wherein the system is further configured to:

determine if a secret noted in a risk factor of the plurality of risk factors provides access to the next cloud object, wherein the secret is included in an EDS of the current cloud object.

24. The system of claim 16, wherein the system is further configured to:

detect an escalation path leveraging multiple hops across identity and network access.

25. The system of claim 16, wherein the system is further configured to:

detect an escalation path leveraging multiple hops across different cloud computing platforms in the cloud environment.

26. The system of claim 16, wherein the system is further configured to:

perform a static analysis of each cloud object.

27. The system of claim 16, wherein each cloud object is a node in the security graph.

28. The system of claim 16, wherein detecting the escalation paths includes any one of: deterministic detection and un-deterministic detection.

* * * * *